No. 652,139. Patented June 19, 1900.
J. B. PEDRICK.
THRESHING MACHINE.
(Application filed Apr. 20, 1899.)
(No Model.) 3 Sheets—Sheet 1.
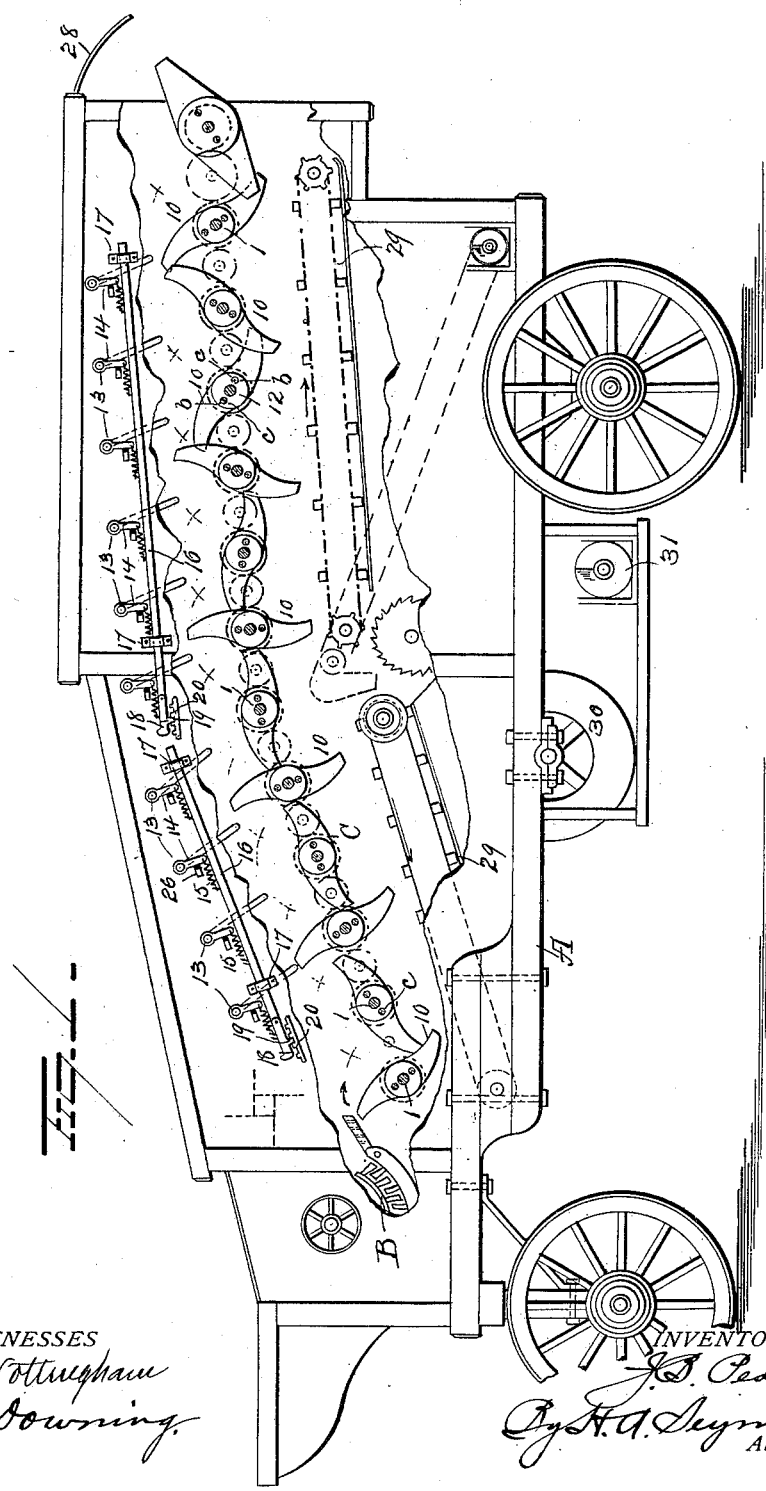

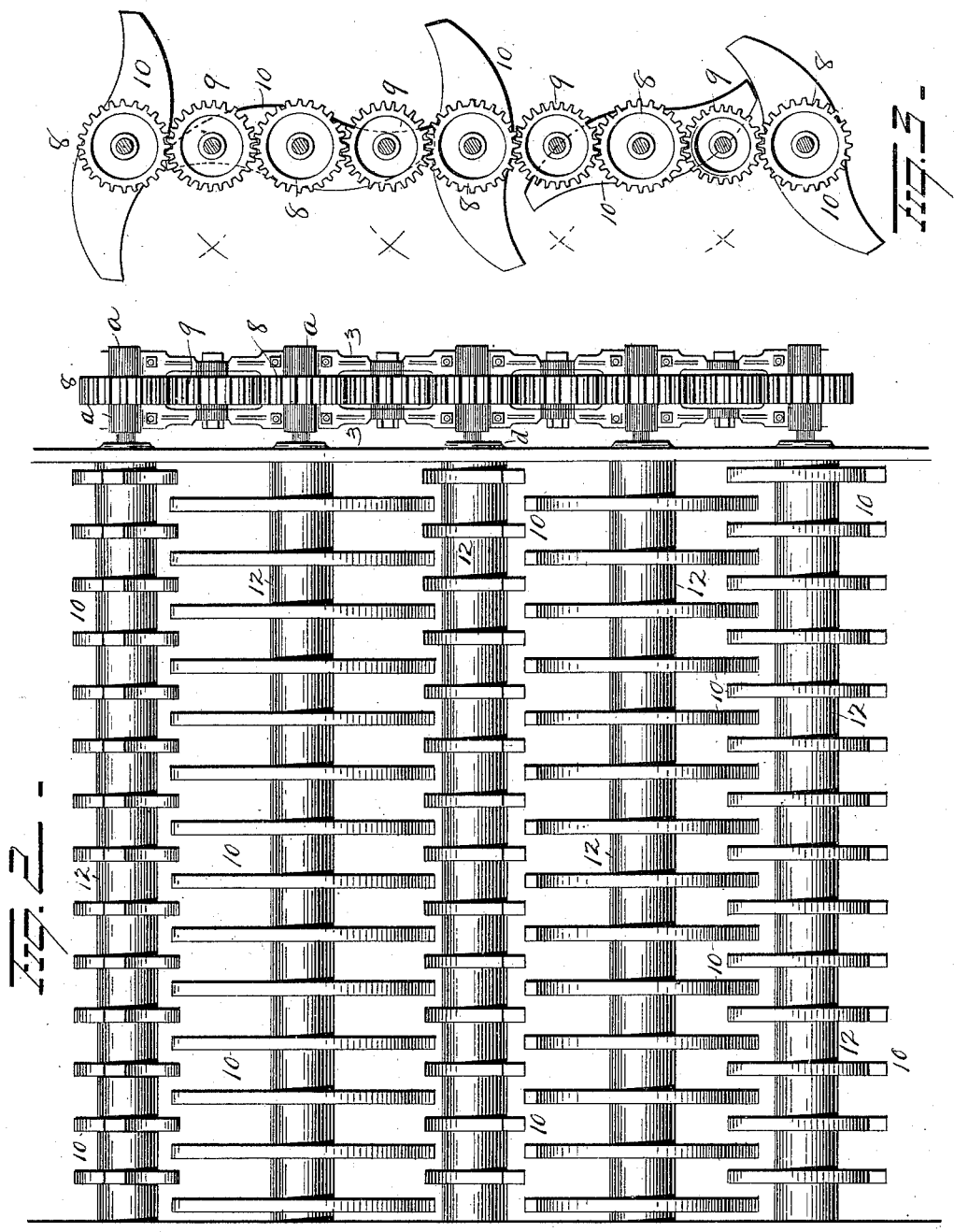

No. 652,139. Patented June 19, 1900.
J. B. PEDRICK.
THRESHING MACHINE.
(Application filed Apr. 20, 1899.)
(No Model.) 3 Sheets—Sheet 3.
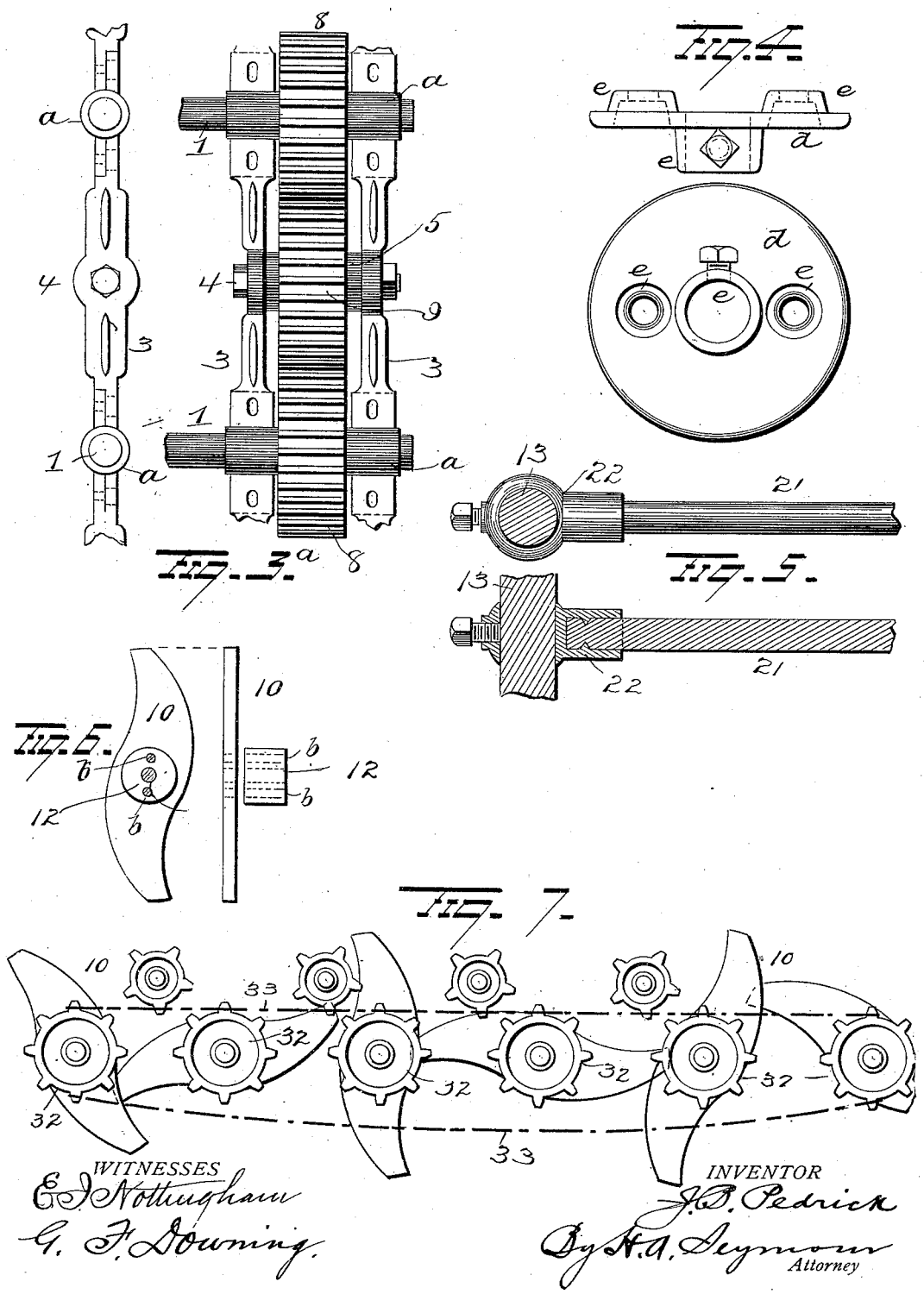
WITNESSES
E. J. Nottingham
G. F. Downing
INVENTOR
J. B. Pedrick
By H. A. Seymour
Attorney

UNITED STATES PATENT OFFICE.

JOSEPH B. PEDRICK, OF COLUMBUS, INDIANA.

THRESHING-MACHINE.

SPECIFICATION forming part of Letters Patent No. 652,139, dated June 19, 1900.

Application filed April 20, 1899. Serial No. 713,750. (No model.)

*To all whom it may concern:*

Be it known that I, JOSEPH B. PEDRICK, a resident of Columbus, in the county of Bartholomew and State of Indiana, have invented certain new and useful Improvements in Threshing-Machines; and I do hereby declare the following to be a full, clear, and exact description of the invention, such as will enable others skilled in the art to which it appertains to make and use the same.

My invention relates to an improvement in threshing-machines, one object of the invention being to provide improved means for separating the grain from the straw.

A further object is to provide a threshing-machine which will be simple in construction and most effectual when in operation.

With these objects in view the invention consists in certain novel features of construction and combinations and arrangements of parts, as will be more fully hereinafter described, and pointed out in the claims.

In the accompanying drawings, Figure 1 is a view, partly in section, illustrating my improvements. Fig. 2 is a plan view of the conveyer. Figs. 3, 3ª, 4, 5, and 6 are views of details, and Fig. 7 is a view of a modified form of my invention.

A represents a threshing-machine frame of any approved construction, and B a cylinder and concave, disposed in the forward end thereof, adapted to deposit the grain and straw upon my improved conveyer C, which will now be described. A series of shafts 1 extend from one side to the other of the frame A and are spaced a suitable distance apart. The shafts 1 project outside of the frame at one side and have mounted thereon a frame 2, composed of a series of bars 3, having bearings at their central portions and secured at their ends to lugs projecting from bosses *a*, mounted on the shafts. The bearings in the central portions of the bars 3 are for the reception of pins or bolts 4, on each of which a suitable sleeve 5 is mounted. The central shaft 6 projects outside of the frame A and is provided on its end with any approved pulley 7, adapted to be turned by a belt connected with and operated by any approved engine. (Not shown.)

A gear-wheel 8 is secured on the end of each shaft 1, and an idle gear-wheel 9 is mounted on each sleeve 5 and adapted to mesh with the gears on the shafts to turn all of said gears and shafts simultaneously and at the same rate of speed. A series of agitators or conveyers 10 are secured between their ends on the shafts 1 and are spaced apart by blocks 12. The blocks and agitators are provided with alined holes *b* for the reception of rods *c* to compel the simultaneous turning of all the agitators. The agitators on each shaft are arranged out of alinement with the agitators on the next adjacent shafts to permit the agitators on one shaft to pass between the agitators on the next adjacent shafts. The agitators or conveyers 10 are made with rearwardly-curved edges, as shown, and are so arranged with relation to the next succeeding agitators that the agitators of one shaft will take the straw from the shaft in front of it before the forward agitators begin their downward stroke, and hence avoid any possibility of the conveyer becoming choked.

A series of shafts 13 are mounted on the frame A above the agitators or conveyers, and said shafts are provided with downwardly-projecting lugs 14 at their ends, which are connected by coiled springs 15 with a rod 16, movably mounted in suitable bearing-blocks 17, as shown. One end of the rod 16 is provided with a pivoted arm 18, having a downwardly-projecting lug 19 at its end to engage a notched bar 20 on the frame to adjust the rod 16 to regulate the normal vertical position of suitable downwardly-projecting fingers 21, secured on the shafts 13, and to regulate the tension of the springs 15. A socket-piece 22 is provided for each finger 21 by means of which to secure the same to the shaft 13. Suitable cushion-blocks 26 are secured to the frame A and are adapted to be struck by the downwardly-projecting lugs 14 to limit their rearward movement. I may provide as many shafts 13 and connecting-rods 16 as may be desired. In the accompanying drawings I have shown two series; but it may be found advisable to employ more than two series or only one, and hence I would have it understood that I do not limit myself to any particular number or arrangement of this improvement.

The downwardly-projecting fingers 21 serve to detain the straw on the conveyer and prevent it from passing too rapidly through the machine without being thoroughly threshed, and as the fingers 21 are mounted to yield they will not stop the passage of straw, but will merely detain the same in the machine.

The last series of conveyers are made preferably larger than the rest of the conveyers to give the straw a full throw out of the machine, and a deflector 28 is provided on the outlet of the machine to guide the straw. A suitable bracket d, having collars e therein for supporting the shafts 1 and rods b, is secured to the frame A for supporting each shaft 1.

Any approved seed-conveyers 29, fan 30, and ejector 31 may be provided for conveying the grain from the machine.

Instead of providing a chain of gears for operating the conveyer, as above described, I might employ such a construction as shown in Fig. 7. In this form of my invention I provide a sprocket-wheel 32 on the end of each shaft 1 and connect the same by a sprocket-chain 33. A series of idle sprocket-wheels are mounted on the frame A and disposed above the sprocket-chain to hold the same in engagement with the sprocket-wheels 32.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a threshing-machine, the combination with a frame, of a conveyer therein, a longitudinally-movable rod mounted in said frame over the conveyer, shafts mounted transversely in said frame above the conveyer and having downwardly-projecting lugs thereon, springs attached at one end to said lugs and at their other ends to the longitudinally-movable rod and fingers depending from the shafts and free at their lower ends.

2. In a threshing-machine, the combination with a frame, of a conveyer, a longitudinally-movable rod mounted in said frame over the conveyer, shafts mounted transversely in the frame, having downwardly-projecting lugs thereon, springs connected to said lugs and the rod, a finger secured to and depending freely from each shaft, springs connected at their respective ends to the lugs on the shafts and the longitudinally-movable rod, and means for locking the latter at any desired adjustment.

3. In a threshing-machine, the combination with a frame, of a series of shafts mounted in said frame, agitators mounted between their ends on said shafts, a chain of gear-wheels connecting said shafts to operate all of said agitators simultaneously and a series of depending, spring-retained, retarding-fingers disposed over said conveyer.

4. In a threshing-machine, the combination with a frame, of a series of shafts mounted in said frame and projecting from one side thereof, a series of rotary agitators mounted on the shafts, bars connecting the projecting ends of the shafts and constituting a frame having a bearing centrally between the ends of each bar and at the ends of said bars, gears on the ends of said shafts and idle gears on the bearings in central portion of the bars, meshing with the gear-wheels on the shafts.

5. In a threshing-machine, the combination with a frame, of a conveyer in the frame, rods mounted longitudinally in said frame, shafts having free downwardly-projecting fingers thereon, lugs on said shaft, springs connecting said lugs with the rods and cushion-blocks on the frame against which said lugs are adapted to abut.

In testimony whereof I have signed this specification in the presence of two subscribing witnesses.

JOSEPH B. PEDRICK.

Witnesses:
   J. N. D. REEVES,
   NORVAL H. HEGE.